E. E. JOHNSON.
PUMPING MECHANISM.
APPLICATION FILED NOV. 14, 1921.
1,438,495.
Patented Dec. 12, 1922.
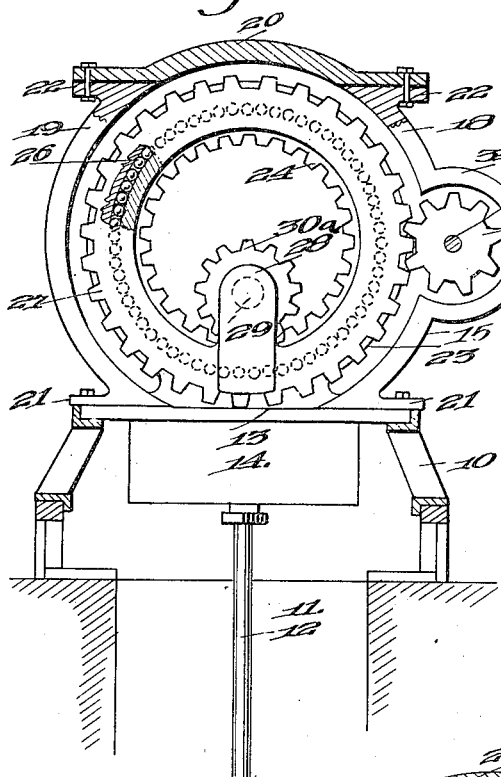
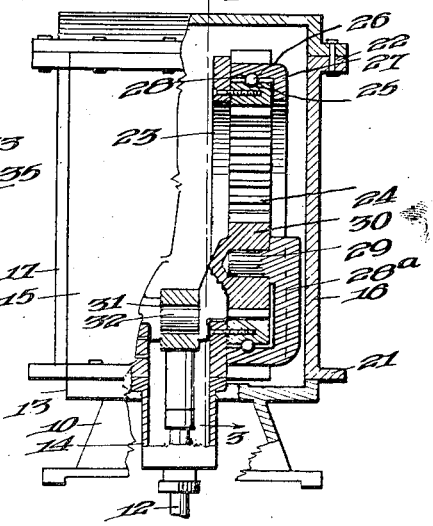
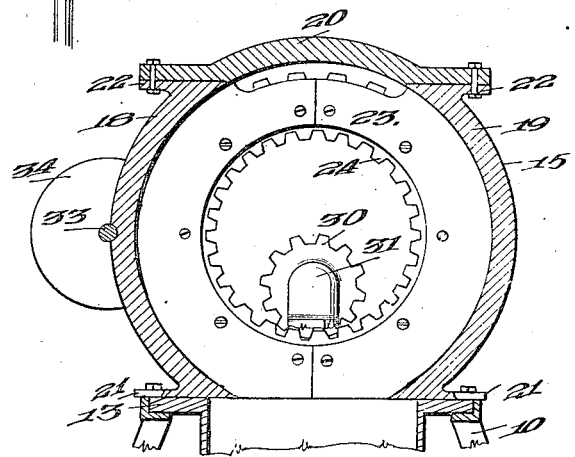
Inventor
Edward E. Johnson
By Whiteley and Ruckman
Attorneys Patented Dec. 12, 1922.

1,438,495

UNITED STATES PATENT OFFICE.

EDWARD E. JOHNSON, OF ST. PAUL, MINNESOTA.

PUMPING MECHANISM.

Application filed November 14, 1921. Serial No. 515,054.

*To all whom it may concern:*

Be it known that I, EDWARD E. JOHNSON, a citizen of the United States, residing at St. Paul, in the county of Ramsey and State of Minnesota, have invented certain new and useful Improvements in Pumping Mechanism, of which the following is a specification.

My invention relates to pumping mechanism of the type adapted to operate what are known as deep well pumps. It is the principal object of my invention to provide in connection with the pump rod, means for operating the rod which is of a compact nature relative to the length of stroke of the rod, and is brought close to the foundation or support for the same, so that a rigid and solid construction is provided of relatively small magnitude in proportion to the length of stroke of the pump rod, and in which racking and straining of various types is reduced to a minimum.

It is a further object of my invention to provide rotary gear mechanism housed within a compact casing member, which is adapted to hold the grease for lubricating the elements of the organization, and to have all of the effective or coacting parts of said rotating mechanism, which is connected to the pump rod for reciprocating the same, operate between common bounding planes, thus eliminating side thrusts and torque which cause inequalities of wear, straining of the parts, increase the power required, and tend to shorten the life of the apparatus.

Specifically my invention comprises a casing or housing having a pump rod extending therein through a stuffing box provided in said housing, which housing is substantially circular in cross section through its major plane, within which is fixedly mounted an internal gear. This internal gear provides the support or is in the plane of the support of an external gear which is mounted to rotate about the internal gear, and which preferably is journaled upon ball bearings or roller bearings interposed between the adjacent surfaces of the fixed gear and the rotatable gear. Journaled upon the rotatable gear is a spur gear of half the diameter of the internal gear which meshes with the internal gear and which has a journal connection with the pump rod, the axis of which cuts the pitch line of the spur gear. As the spur gear is carried around by the external gear in mesh with the internal gear it causes the journal pin of the pump rod to reciprocate back and forth in a straight line along and throughout the extent of a diameter of the internal gear.

Preferably this organization is formed in duplicate in parallel relation with the journal pin for the pump rod extending between pairs of spur gears, respectively, operative upon spaced pairs of external gears, and internal gears surrounded thereby, thus giving a perfectly balanced thrust to the pump rod.

The full objects and advantages of my invention will appear in connection with the detailed description thereof and the novel features embodied in my inventive idea will be particularly pointed out in the claims.

In the accompanying drawing, which illustrates the application of my invention in one form—

Fig. 1 is a side elevational view, with some parts in section of the pump operating mechanism, Fig. 2 is a part sectional elevational view taken at right angles to the view of Fig. 1, Fig. 3 is a sectional view on line 3—3 of Fig. 2.

A foundation member or support 10 of any desired form is provided and may span the well opening or piping 11, which extends down to the pump cylinder, not shown, and within which the pump rod 12 operates. The base 10 is provided with a closure member or cap 13 having therein a stuffing box 14, through which the pump rod 12 extends. Upon the base or support 10 is mounted a casing 15, which is provided with plain surfaced side plates 16 and 17 and curved end plates 18 and 19, all bolted together to form a unitary enclosing member. The casing 15 is open at top and bottom, being closed at the bottom by the cap member 14, and at the top by a special cap member 20. The members 16, 17, 18 and 19 are provided at top and bottom with symmetrical flanges 21, 22, by which the casing is secured upon the support or base member 10 and receives the cap member 20.

Fast upon the side members 18, 19 and near the center thereof are flanges 23, to which are bolted in fixed and spaced relation a pair of internal gears 24, said gears preferably being positioned between vertical planes. The outer cylindrical surface of the fixed gears 24 is provided with a race 25 upon which are positioned a multiplicity of ball bearings 26, and the ring gear 27 has its inner annular surface provided with a race 28 corresponding in position and extent to the race 25 of the fixed gear 24. By this means the ring gear 27 is directly journaled upon the fixed gear 25, the inner surface of the ring gear surrounding the outer surface of the fixed gear. Fast upon the ring gear 27 is an arm 28ª carrying a journal pin 29, upon which is journaled a pinion or spur gear 30, this structure being duplicated on each side of the casing. The spur gear 30 is of half the diameter of the fixed gear 24 and meshes with said fixed gear and is contained within the bounding planes of the fixed gear. A pin or journal member 31 extends between the two spur gears 30, having its axis in the pitch line thereof and is rigidly connected to both spur gears. The pump rod 12 is journaled at 32 upon the pin 31. A shaft 33, driven from any suitable source of power, extends within an extension of the casing member 18, as shown at 34, and has thereon pinions 35, which mesh with the external gears 27.

The operation of the pumping device is as follows: The parts being assembled, are all enclosed within the casing 15, which has a certain amount of grease or heavy oil therein for lubricating the parts. Power from shaft 33 is communicated through pinions 35 to ring gears 27, which rotate freely and easily upon the roller or ball bearings 26, carrying with them the spur gears 30 and the attached cross pin 32. The spur gears 30, however, being in mesh with the internal gears 24, are caused to roll upon the same, and, since the diameter of the spur gears is exactly half that of the internal gears, the continued rotation of the spur gears will hold the pin 32 in a straight line, causing it to reciprocate back and forth across the space between the internal gears, along and to the extent of a diameter thereof, thereby reciprocating the pump rod 12.

The advantages of my invention will be apparent. First the driven parts are operative between common bounding planes, all the lines of force thus running along the same direction, and preventing twisting, strains and uneven wear. Second, the mechanism is remarkably compact and occupies the smallest possible space, considering the length of travel of the pump rod. Thus, if the internal gear is three feet in diameter, the pump rod will travel three feet, and the entire structure, including housing, and base, and all operating parts will not need to be over four and a half feet high and about one foot across. Third, all of the gearing will constantly run in oil, thus being self-lubricating and insuring a long life, with relatively small consumption of power.

I claim:—

1. In pumping mechanism, a pump rod and means for operating the same, comprising a fixed internal gear, an annular rotatable member having its inner wall surrounding the outer wall of said internal gear, means for rotating the annular member, a spur gear carried by the annular member and meshing with the internal gear, and means connecting the pump rod with the spur gear for reciprocating the pump rod.

2. In pumping mechanism, a pump rod, and means for operating the same, comprising a support, an internal gear fixedly mounted thereon, a ring gear mounted for rotation around said fixed gear, a spur gear carried by the ring gear which meshes with the internal gear, and means connecting the pump rod with the spur gear for reciprocating the pump rod.

3. In pumping mechanism, a pump rod, and means for operating the same, comprising a support, an internal gear fixedly mounted thereon, a ring gear mounted for rotation around said fixed gear, a spur gear carried by the ring gear which meshes with the internal gear, means connecting the pump rod with the spur gear for reciprocating the pump rod, and a casing surrounding the ring gear, all of the effective portions of the above recited parts being contained and operating within common bounding planes.

4. In pumping mechanism, a pump rod and means for operating the same, comprising a support, a vertically disposed internal gear fixedly mounted thereon, a ring gear mounted for rotation around said fixed gear, a spur gear carried by the ring gear and meshing with the internal gear, means connecting the pump rod with the spur gear for vertically reciprocating the pump rod, and a casing surrounding the ring gear, all of the effective portions of the above recited parts being contained and operating within common bounding planes.

5. In pumping mechanism, a pump rod and means for operating the same, comprising a support, a vertically disposed internal gear fixedly mounted thereon, a ring gear mounted for rotation around said fixed gear, a spur gear carried by the ring gear and meshing with the internal gear, and means connecting the pump rod with the spur gear for vertically reciprocating the pump rod, all of the effective portions of the above recited parts being contained and operating within common bounding planes.

6. In pumping mechanism, a pump rod, and means for operating the same, comprising a support, an internal gear fixedly mounted thereon, a ring gear mounted for rotation around said fixed gear, a spur gear carried by the ring gear which meshes with the internal gear, and means connecting the pump rod with the spur gear for reciprocating the pump rod, all of the effective portions of the above recited parts being contained and operating within common bounding planes.

7. In pumping mechanism, a pump rod, and means for operating the same, comprising a fixed member, a member journaled upon and adapted to rotate about the fixed member, a member carried by the rotating member and engaging the fixed member for actuation thereby, and means connecting the pump rod with the last-named member for reciprocating the pump rod, the effective portions of all said members being contained and operating within common bounding planes.

8. In pumping mechanism, a pump rod and means for operating the same, comprising a fixed internal gear, a member supported for rotation upon the outer wall of said internal gear, a spur gear rotatably mounted on said rotatable member, said spur gear meshing with said internal gear and having a diameter one-half that of said internal gear, a crank pin secured to said spur gear, and a pump rod journaled on said crank pin.

9. In pumping mechanism, a pump rod and means for operating the same, comprising a fixedly mounted internal gear, a ring gear mounted for rotation around said fixed gear, roller bearings interposed between the adjacent surfaces of the ring gear and the fixed gear, a spur gear carried by the ring gear and meshing with the internal gear, and means connecting the pump rod with the spur gear for reciprocating the pump rod.

10. In pumping mechanism, a pump rod, and means for operating the same, comprising two internal gears fixedly mounted in spaced relation to one another, two annular members supported for rotation about said internal gears, a spur gear on each of said rotatable members, said spur gears meshing with said internal gears, respectively, and a crank pin secured to said spur gears, said pump rod being journaled on said crank pin.

11. In pumping mechanism, a pump rod, and means for operating the same, comprising a pair of fixed members supported in spaced relation, a corresponding pair of annular members adapted to rotate about the fixed members, a crank pin centrally positioned between said members to which the pump rod is journaled, and spur gears fast on the ends of the crank pins journaled upon the annular members and adapted to be actuated by the fixed members for effecting reciprocation of the pump rod.

12. In pumping mechanism, a pump rod, and means for operating the same, comprising two internal gears, fixedly mounted in spaced relation to one another, two annular members supported for rotation about said internal gears, a spur gear on each of said rotatable members, said spur gears meshing with said internal gears, respectively, a crank pin secured to said spur gears, said pump rod being journaled on said crank pin, and a casing enclosing all of said parts and having a stuffing box through which said rod extends and adapted to contain grease for lubricating all said parts.

In testimony whereof I affix my signature.

EDWARD E. JOHNSON.